(12) United States Patent
Schuh et al.

(10) Patent No.: US 12,129,892 B2
(45) Date of Patent: Oct. 29, 2024

(54) BEARING BUSH FOR A ROTATING SHAFT, BEARING SHIELD, ELECTRIC MOTOR AND METHOD FOR MANUFACTURING A DAMPING ELEMENT

(71) Applicant: Siemens Aktiengesellschaft, Munich (DE)

(72) Inventors: Carsten Schuh, Baldham (DE); Thomas Soller, Bayern (DE); Rolf Vollmer, Gersfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 386 days.

(21) Appl. No.: 17/681,335

(22) Filed: Feb. 25, 2022

(65) Prior Publication Data
US 2022/0275830 A1      Sep. 1, 2022

(30) Foreign Application Priority Data

Feb. 26, 2021   (EP) .................................... 21159605

(51) Int. Cl.
| F16C 33/20 | (2006.01) |
| B22F 10/10 | (2021.01) |
| B33Y 10/00 | (2015.01) |
| B33Y 80/00 | (2015.01) |
| F16C 17/02 | (2006.01) |
| F16F 7/00 | (2006.01) |
| H02K 5/14 | (2006.01) |

(52) U.S. Cl.
CPC ............ *F16C 33/208* (2013.01); *B22F 10/10* (2021.01); *B33Y 10/00* (2014.12); *B33Y 80/00* (2014.12); *F16C 17/02* (2013.01); *F16F 7/00* (2013.01); *H02K 5/14* (2013.01)

(58) Field of Classification Search
CPC ......... F16C 17/02; F16C 33/14; F16C 33/208
See application file for complete search history.

(56) References Cited

U.S. PATENT DOCUMENTS

| 6,745,740 | B1 * | 6/2004 | Decuir | ..................... F16C 7/023 |
|           |      |        |        | 123/192.1 |
| 2004/0170459 | A1 | 9/2004 | Taylor | .............................. 400/70 |
| 2008/0310777 | A1 * | 12/2008 | Kim | ........................ F16C 33/14 |
|           |      |        |        | 384/13 |
| 2017/0002858 | A1 | 1/2017 | Hunter | ..................... F16C 17/10 |

FOREIGN PATENT DOCUMENTS

| JP | 2019015369 | 1/2019 | ............. F16F 15/02 |
| WO | 2012084688 | 6/2012 | ............. B23K 26/34 |

* cited by examiner

*Primary Examiner* — James Pilkington
(74) *Attorney, Agent, or Firm* — Slayden Grubert Beard PLLC (57) ABSTRACT

Various teachings herein may be used to make a bearing bush for a rotating shaft, wherein a wall of the bearing bush has a wall thickness which amounts to less than 10% of the diameter of the bearing bush. In the axial direction, the bearing bush is made from a plurality of layers connected with a material bond. Each layer has a layer thickness between 10 μm and 200 μm and the wall has closed cavities which are filled with a powder.

10 Claims, 6 Drawing Sheets

BEARING BUSH FOR A ROTATING SHAFT, BEARING SHIELD, ELECTRIC MOTOR AND METHOD FOR MANUFACTURING A DAMPING ELEMENT

CROSS-REFERENCE TO RELATED APPLICATIONS

This application claims priority to EP Application No. 21159605.1 filed Feb. 26, 2021, the contents of which are hereby incorporated by reference in their entirety.

TECHNICAL FIELD

The present disclosure relates to electric motors. Various embodiments may include bearing busks, bearing shields, electric motors, and/or methods for manufacturing a damping element.

BACKGROUND

With rotating machines, the rotors have a dynamically changing relative movement in the radial and also the axial direction in relation to the virtually stationary stators or to a housing. Here this problem basically relates to both electric motors and also combustion engines. With electric motors, the bearing shield in particular is affected here, said bearing shield having a bearing bush which is used as a damping element. With combustion engines, this problem relates to the bearing of the cam shaft and the bearing of the crankshaft. The problem is described here below by way of example in respect of electric motors.

The cited relative movements can be embodied differently and in a dynamically changing manner both along the rotor axis and also on the rotor outer circumference. The respective local gap dimension between the rotor and stator therefore de facto changes dynamically at any fixed point on the rotor surface. Here the rotors themselves move dynamically with different resonance modes, which are essentially caused and influenced by the generated electromagnetic forces, the mechanical centrifugal forces (e.g. imbalances) and the dynamic rigidities of the rotor, rotor bearing in the housing, the housing itself and the bearing of the housing.

With electric motors, the medium which brings about a damping and is located in the rotor gap can also play a role, particularly if the medium is not a gas, but instead a fluid such as e.g. water or a silicon oil. The mechanical functional chain can be described here as a series circuit of the following elements.

On the one hand, the geometric tolerances of the structure of the rotor, the bearing and the stator or the housing. Here imbalances, bearing play or radially different thermal expansion coefficients or eccentricities and/or rigidity differences play a role, for instance. Furthermore, different electromagnetic fields and inductances occur in the radial direction. This is caused by material differences, fluctuations in the electrical excitation current and the induced eddy currents. Furthermore, in the cited functional chain, different local beatings of the overall structure play a role during operation, which result in resonant dynamic natural frequencies of the rotor axis occurring for each specific control and load case. The thus generated dynamic relative movements of the rotor axis either act directly or indirectly on what is known as the bearing outer ring.

On account of the thus described mechanical functional chain, an excited resonant natural oscillation of the rotor axis results in a high-dynamic excitation and forwarding of mechanical shock events with relative movements in the region of less than μm within the bearing and the bearing bush, as far as into the bearing shield. This is generally referred to as dynamic bearing play. Mechanical oscillations in the housing and housing bearing are in turn excited by way of these shock events, which are then noticeable as vibrations, which act as structure-borne sound, and also as a result of acoustic phenomena.

In order to reduce engine noise and oscillations, according to the prior art the following measures are implemented, which however generally significantly reduce the bearing rigidity and can thus require higher relative gap dimensions. On the one hand, the application of inert masses and possibly the over dimensioning of mechanical components for shifting the resonance frequencies into non-critical regions, in particular far away from the region of the application speeds. Furthermore, the installation of rubber O-rings in the bearing seat of the rotors is a tried and tested means. Moreover, magnetic bearings are occasionally used for the rotors. However, as already presented, all of these measures result in higher gap dimensions in the motor.

SUMMARY

The teachings of the present disclosure may provide an improvement in the damping of the rotor oscillations occurring in the bearing and or also in the bearing bush and in the bearing shield while simultaneously obtaining or even increasing the bearing rigidity in the radial and axial direction. Furthermore, a reduction in the mechanical oscillations and the noise development on the engine is in the foreground. For example, some embodiments include a bearing bush for a rotating shaft (4), wherein a wall (6) of the bearing bush (2) has a wall thickness (8), which amounts to less than 10% of the diameter (10) of the bearing bush (2), characterized in that in the axial direction (20) the bearing bush (2) is made from a plurality of layers (12) connected with a material bond, each of which has a layer thickness (14), which lies between 10 μm and 200 μm and the wall (6) has closed cavities (16) which are filled with a powder (18).

In some embodiments, the bearing bush (2) has cavities (16), which have a maximum cross-section (22) which is less than 5 mm$^2$.

In some embodiments, the bearing bush (2) has cavities (16), which have a maximum cross-section (22) which is less than 3 mm$^2$.

In some embodiments, a powder fill level (24) of the cavities (16) amounts to at least 60%.

In some embodiments, a powder fill level (24) of the cavities (16) amounts to at least 80%.

In some embodiments, a wall structure (26) of the bearing bush (2) is formed from a metal alloy.

In some embodiments, the metal alloy is an iron alloy.

In some embodiments, the powder (18) in the cavities (16) comprises a material which has a higher melting temperature than the material of the wall structure (26).

In some embodiments, the powder (18) in the cavities (16) comprises a material which has a higher density than the material of the wall structure (26).

As another example, some embodiments include a bearing shield comprising a bearing bush (2) as described herein.

As another example, some embodiments include an electric motor with a bearing shield (28) as described herein.

As another example, some embodiments include a method for manufacturing a damping element (32) by means of a screen printing method (34) comprising: printing a first subregion (36) of a first layer (38) with a first screen printing paste (40), printing a second subregion (42) of the first layer (38) with a second screen printing paste (44), wherein the second subregion (42) in the layer plane is enclosed by the first subregion (36), drying the first layer (38), continuing the printing of further layers (46) until a three-dimensional green body (48) is formed, in which the second subregions (42) of the layers (38, 46) form a volume (50) enclosed by the first subregions (36), and carrying out a thermal treatment process (52) at a process temperature, which brings about a sintering process of a material of the first screen printing paste (40) and with which, with the material of the second screen printing paste (44), the sintering process essentially remains absent at the process temperature.

In some embodiments, the first screen printing paste (40) contains a material based on iron.

In some embodiments, a debinding process (54) is carried out before the thermal treatment process (52).

In some embodiments, the damping element (32) is a bearing bush (2).

BRIEF DESCRIPTION OF THE DRAWINGS

Further features of various embodiments of the teachings herein are explained in more detail on the basis of the following figures. This involves purely exemplary embodiments, which do not represent a restriction to the scope of the disclosure. The drawings show.

DETAILED DESCRIPTION

The teachings of the present disclosure may be incorporating in a bearing bush for a rotating shaft comprising a wall, which has a wall thickness which amounts to less than 10% of the diameter of the bearing bush. The bearing bush is characterized in that in the axial direction it is established from a plurality of layers which are connected in a material bonded manner. Each of these layers has a layer thickness which lies between 80 μm and 300 μm. Furthermore, the wall has closed cavities which are filled with a powder.

The described bearing bush therefore has a very thin wall, in relation to the overall diameter of the bearing bush, said wall being established by way of discrete, material-bonded layers. These material-bonded layers can be established by means of an additive manufacturing method, in particular by means of a screen printing method in the described layer thickness. The screen printing method is suited to realizing cavities with a powder filling in a very narrow wall as an additive manufacturing method. Here this powder filling in the closed cavities brings about a strong pronounced damping behavior, which in turn is used to reduce the described vibrations and the acoustic phenomenon produced in the process, as well as the structure-borne sound of the component. The reduction is carried out here without measures which result in a higher gap dimension, such as e.g. the O-ring seals described in the prior art. Here the described bearing bush is generally a damping element, which can basically also be used at other vibration-loaded points in mechanically functional devices. The arrangement of the described bearing bush in a bearing shield, which is used as a cover shield of a housing of an electric motor, is particularly useful. Here the shaft of a rotor is guided into the motor housing through the bearing shield and the bearing bush. In this respect, the electric motor, which comprises the bearing shield with the described bearing bush, is also part of the invention.

In some embodiments, the bearing bush has cavities, which have a maximum cross-section which is less than 5 $mm^2$, in particular less than 3 $mm^2$. Here the term of the maximum cross-section is understood to mean the cut through a cavity in a sectional image which has the maximum possible size. Attempts are generally made also to configure the maximum cross-section to be smaller than 3 $mm^2$, wherein a defined cross-section through a cavity with an even smaller cross-section is more complex in terms of manufacture.

A geometrically measured powder fill level of the cavity amounts here at least to 60%, to 80%, and/or to 90%. Attempts are made to configure the fill level to be as high as possible, which, in manufacturing terms, in each case indicates a technical challenge. With the description of the method, the technical realization of the fill level or the filling of the cavities with powder is described in more detail. The geometrically measured fill level is understood here to mean the level of filling of the cavity, which effects the filling as a result of powder spillage. The fact that a small hollow in the order of magnitude of particles is present in each case between the individual particles of the powder filler means that the specification of the fill level remains unconsidered.

A metal alloy, in particular a metal alloy based on iron or an alloy comprising iron is used as the bearing bush or the bearing bush wall. An alloy of this type can be manufactured on the one hand in a practical way by the already described useful screen printing method or by another additive manufacturing method and can be reinforced in a suitable form by a thermal treatment process in the form of a sintering process.

The powder which is arranged in the cavities here comprises in turn a material, which has a higher melting point than the material of the wall structure. If the wall structure consists as already described, for instance, of a metal based on iron, it is then expedient to configure the powder on a tungsten basis, for instance. During manufacture this is advantageous for instance in that the wall structure of the bearing bush can be shown by a sintering process or another corresponding thermal treatment process, while the material introduced there inside the cavities does not melt or sinter. With the example of tungsten, it is also still clear that in a further embodiment, the powder in the cavities also has a higher density than the material of the wall structure. This brings about still higher damping properties than a material with a lower density.

In some embodiments, there is a method for manufacturing a damping element, such as, for instance, the described bearing bush. The following steps may be carried out here by means of a screen printing method:

A first subregion of a first layer is firstly printed with a first screen printing paste. Furthermore, a second subregion of the first layer is printed with a second screen printing paste. Here the second subregion is designed so that in the respective layer plane it is enclosed by the first subregion. In the structure of several layers which follow one above the other, this results in volume regions (volumes) which are filled with the second screen printing paste. Furthermore, a drying step of the first layer follows, wherein this drying step can also be divided into two sub steps, wherein a drying step firstly takes place after the first subregion is printed and a further drying step takes place after the second subregion is printed.

This described printing process of a first and the second subregion is continued successively and further layers are produced in the process until a three-dimensional green body is formed. In this green body, as mentioned, the second subregions of the layers form a volume enclosed by the first subregions. Furthermore, a thermal treatment process is carried out, which has a process temperature which brings about a sintering process of a material of the first screen printing paste and with the material of the second screen printing paste, the sintering process is essentially absent at the process temperature.

In some embodiments, a plurality of volumes is produced by the method, said volumes being enclosed in the green body by a material of the first regions. This material of the first regions, which is established on an iron basis, for instance, encloses the volumes, by the material of the second regions being present, for instance a tungsten alloy. By means of the described thermal treatment process or sintering process, the material of the first regions, in other words an iron alloy, for instance, is sintered to form a self-supporting structure, a wall structure of the damping element, for instance the bearing bush.

The material of the second regions, which form the described volumes, does not sinter or only sinters to a minimal degree at the described process temperature. With a significant movement of the damping element, the material of the second regions breaks down to form a powder. After the thermal treatment process, the volumes of the green body form the cavities of the damping element (in particular the bearing bush) filled with powder. This powder in the cavities has a marked damping influence on the strong vibration-loaded components.

Basically, after manufacturing the green body by means of the described screen printing method, a debinding process is incorporated before the thermal treatment process (sintering process) described, which is preferably generally likewise a thermal process. In this regard, binding means of the screen printing pastes are burned out by means of thermal decomposition, for instance. The temperatures during the thermal treatment process for debinding are generally below the temperatures for thermal treatment for the sintering process. Here the debinding or sintering process is to be controlled so that all components of the second screen printing paste which are volatile up to the maximum sintering temperature were completely removed from wall regions of the first material which are no longer permeable for gases up to the point in time of their formation.

Figure 1:
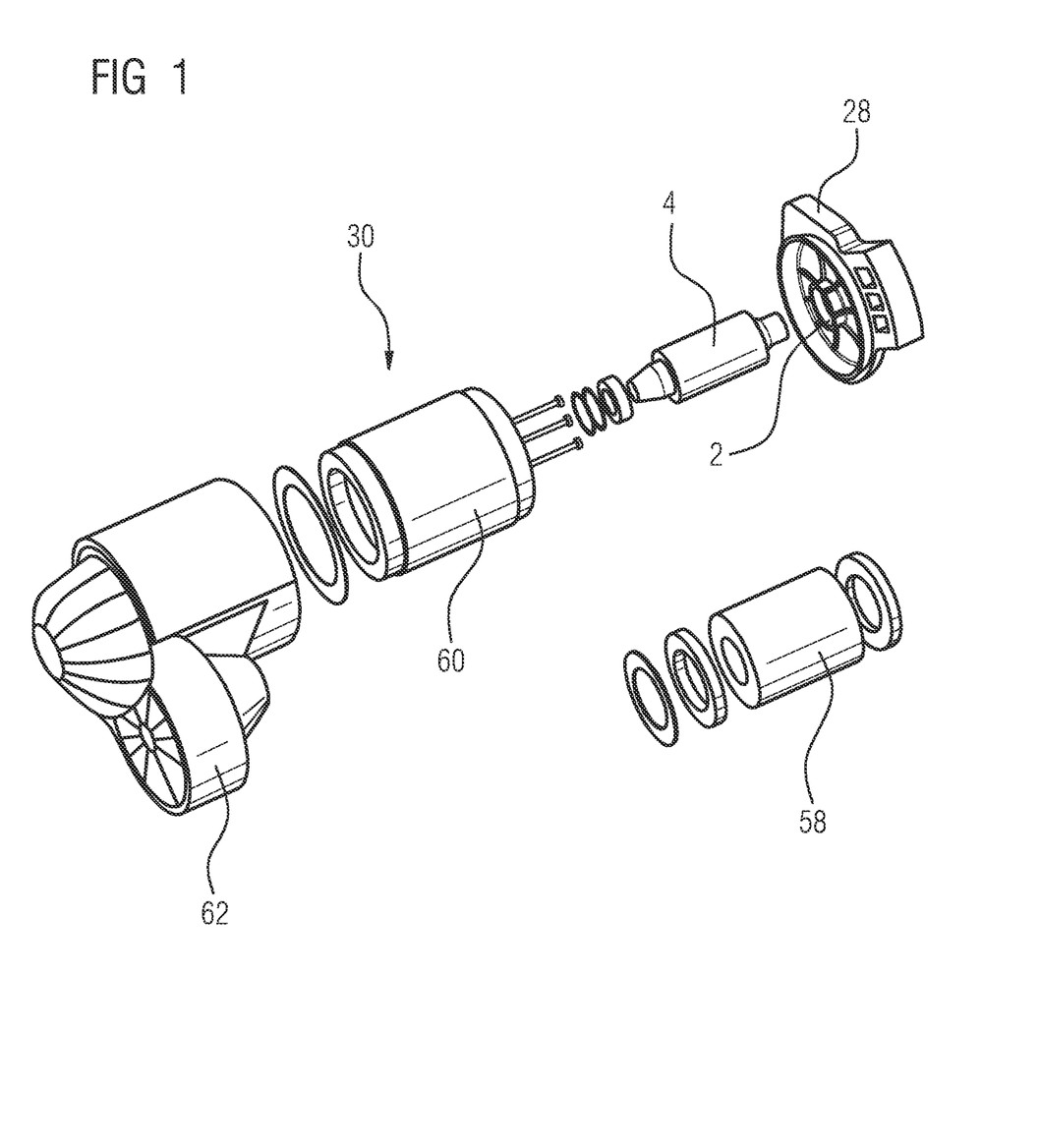
FIG. 1 a three-dimensional exploded representation of an electric motor with a bearing shield incorporating teachings of the present disclosure.
Figure 2:
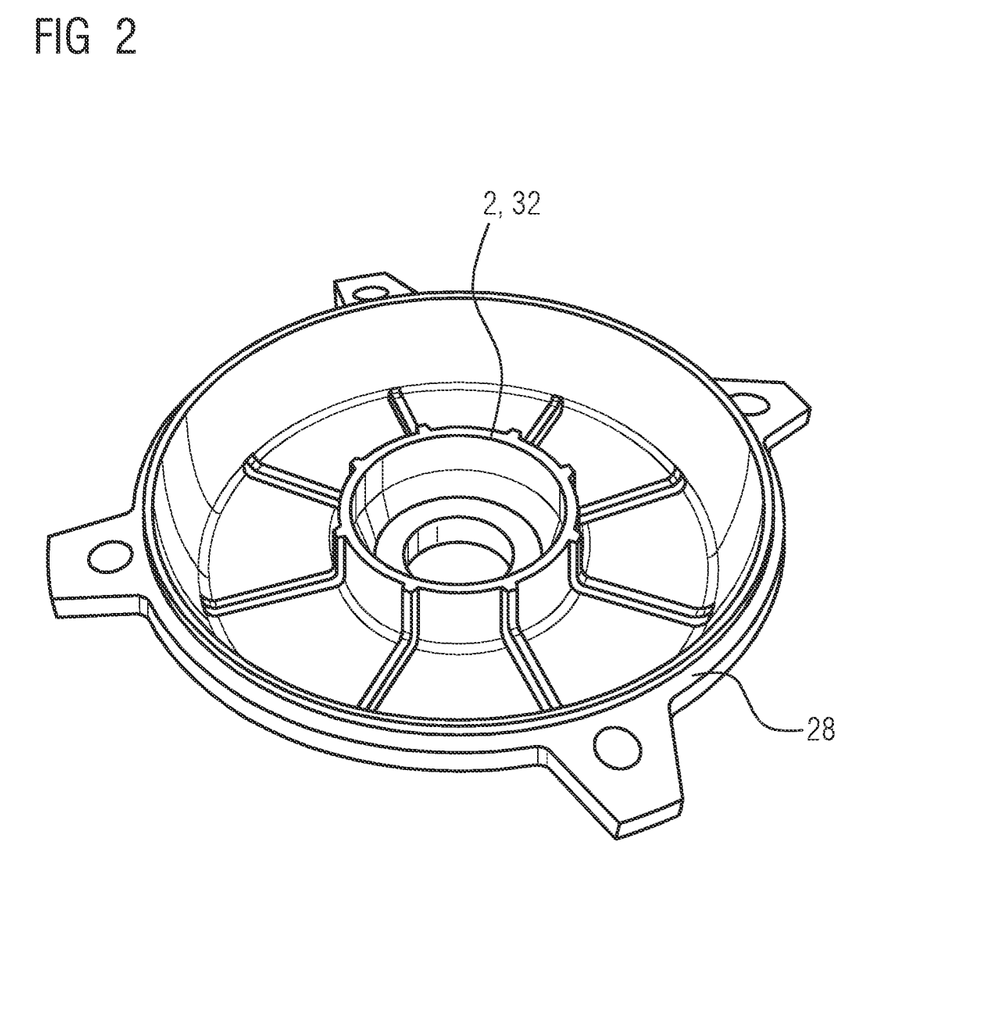
FIG. 2 a three-dimensional representation of a bearing shield with a bearing bush incorporating teachings of the present disclosure.

An overview display of an electric motor 30 is shown in FIG. 1. This electric motor 30 is embodied in the form of a three-dimensional exploded representation. It comprises here a bearing shield 28, a rotating shaft 4, a stator 60 and a rotor 58 arranged on the rotating shaft 4. The stator 58, rotor 60 and shaft 4 are mounted in a housing 62, wherein the bearing shield 28 is used to cover the housing 62 and here the shaft 4 is guided outwards through the bearing shield 28. For this purpose, a bearing bush 2 is introduced into the bearing shield 28, in which a bearing, not shown here, for instance a ball bearing, is attached for this purpose. A more accurate representation of the bearing shield 28 is shown in FIG. 2. The bearing bush 2 can also be referred to more generally as damping element 32.

As already described, with electrical machines such as the electric motor 30 shown in FIG. 1, with rotors 58 dynamically changing relative movements generally occur in a radial or also in an axial direction in respect of the virtually stationary stators, here shown as stator 60, and with respect to the housing 62. The resonances resulting herefrom further act via the axis 4 on the bearing bush 2 of the bearing not shown here. The bearing bush 2 is generally cast into the bearing shield 28. The bearing shield 28 is in turn designed in very many cases from an aluminum cast, which results in this having a low density, but here however also a low damping and a relatively low rigidity.

This frequently results in resonant natural oscillations of the shaft 4 and the rotor 58 and in a high dynamic excitation and forwarding of mechanical shock events with relative movements in the region of a few μm within the bearing and the bearing bush 2 surrounding the bearing. These relative movements are in turn forwarded into the housing 62 in the form of mechanical oscillations, wherein vibrations and acoustic phenomena may result, in other words a significant noise development. Against the background of this problem, it is described below how the bearing bush 2 can be designed in the form of a damping element 32, so that the described oscillations are not forwarded to such an extent into the bearing shield 28 and furthermore into the housing 62. This in turn results in vibrations and unwanted acoustic phenomena on the electric motor 30 being reduced or prevented.

Figure 3:
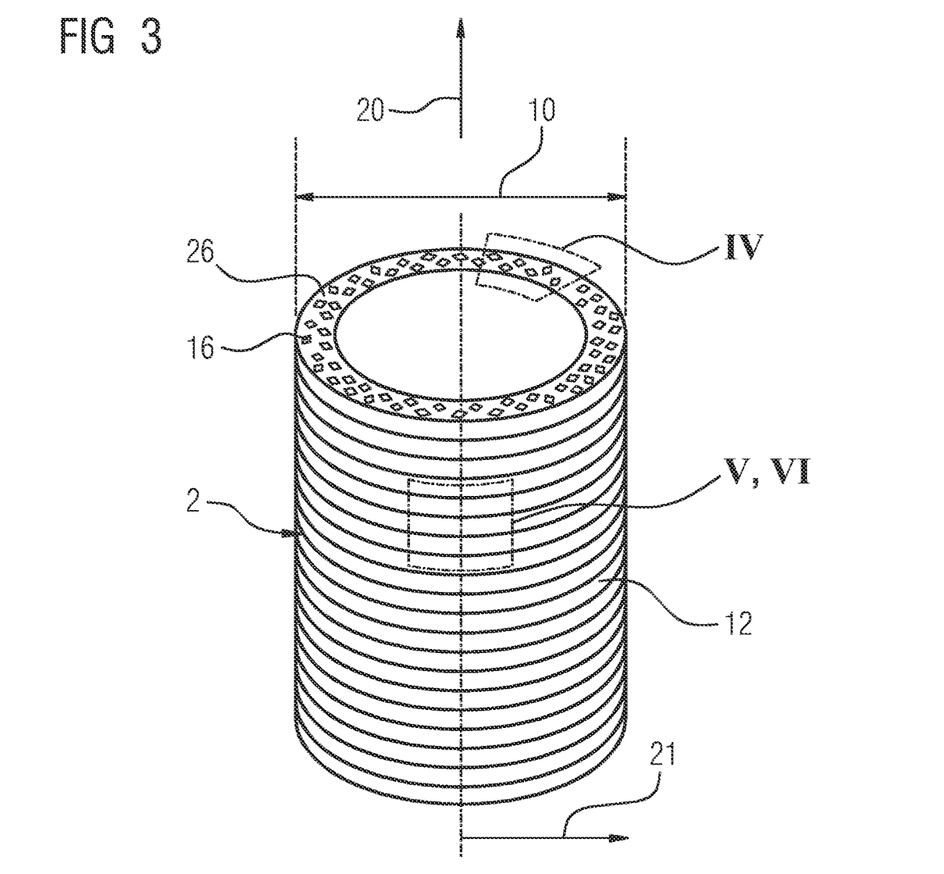
FIG. 3 a three-dimensional representation of a damping element in the form of a bearing bush in a layer composition incorporating teachings of the present disclosure.

To this end, the bearing bush 2, as shown in FIG. 3, is designed in the manner of layers, wherein a plurality of layers 12 with a layer thickness between 10 μm and 200 μm are placed one on top of the other so that the bush 2 is produced. Here the bush 2 has a wall thickness which amounts to less than 10% of the diameter 10 of the bearing bush 2, i.e., the wall thickness 8 is relatively thin in relation to the diameter 10. With a conventional diameter of a bearing bush 2 of 40-70 mm, the wall thickness generally amounts to between 4 and 7 mm and can also be less. Wall thicknesses of 2 mm are likewise usual. Here a wall structure 26 of the bearing bush 2 has cavities 16, which are filled with a powder 18.

Figure 4:
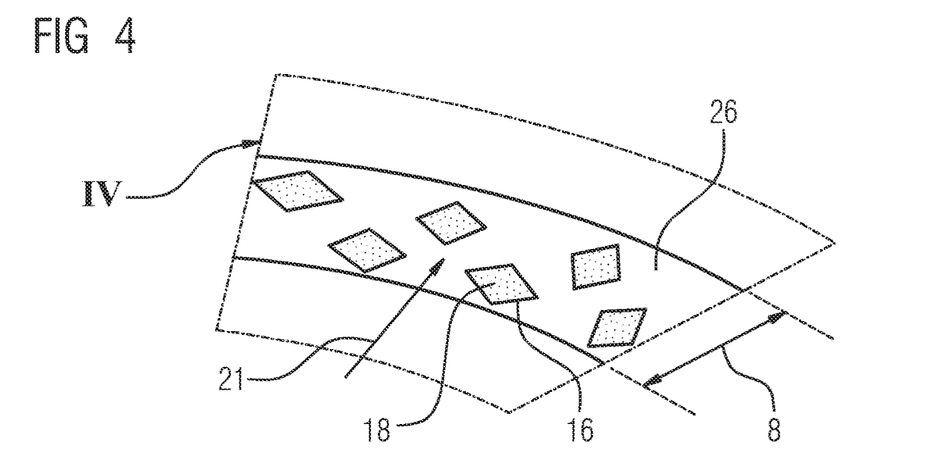
FIG. 4 a section through a bearing bush wall on the basis of the cut IV in FIG. 3.

FIG. 4 shows a cut along the lines described with IV in FIG. 3. In this regard the cavities 16 are embodied to be diamond-shaped, which is purely exemplary here. The cavities 16 can also be shown in the form of honeycomb, in other words in a hexagonal, round or also irregular fashion. The powder 18 disposed therein is used here as a damping means, which results in vibrations, which are transmitted to the bearing bush 2, being absorbed in the wall structure 26 with the cavities 16.

Figure 5:
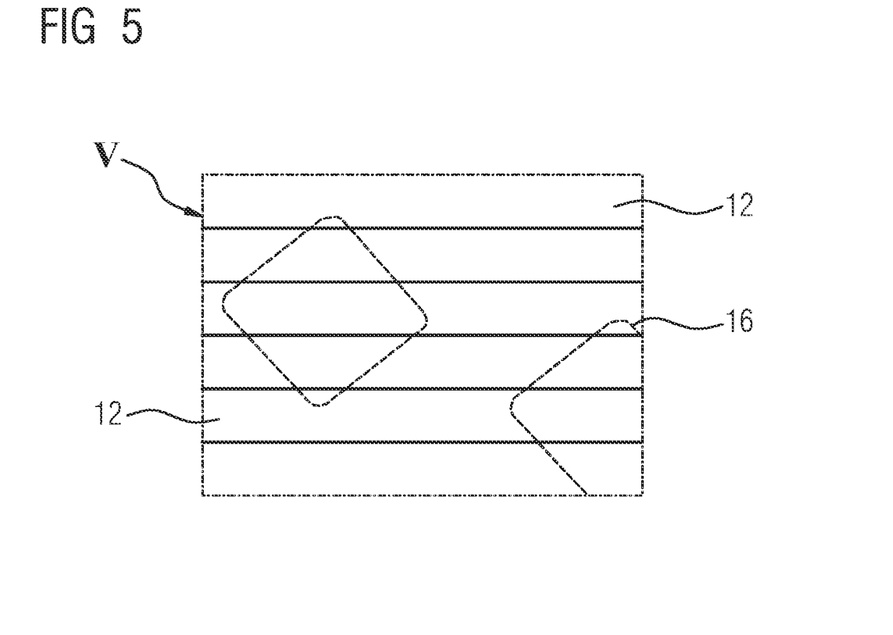
FIG. 5 a cross-section through the cut-out V in FIG. 3 on the outer surface of the bearing bush according to FIG. 3.
Figure 6:
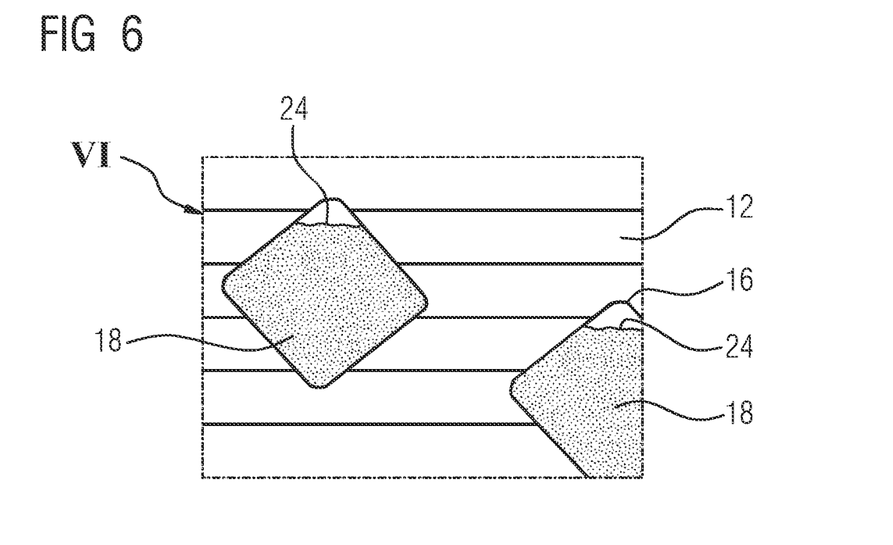
FIG. 6 an inner cross-section along the cut VI in FIG. 3.

A cut V and VI from FIG. 3 is shown in FIGS. 5 and 6 in each case. Here the layered structure of the bearing bush 2 is shown enlarged. Here FIG. 5 shows a view from the outside onto the bearing bush 2, by the cavities 16 only being shown as dashed lines. In FIG. 6, the cut VI from FIG. 3 is shown, which is carried out in the inside of the wall structure 26 of the bearing bush 2, so that in FIG. 6 direct cuts through the cavities 16 are shown.

In some embodiments, the cavities 16 are filled as high as possible with the powder 18. A powder fill level 24 is produced here, which is shown in FIG. 6. The line 24 in FIG. 6 shows how high the fill level of the powder 18 is in the cavity 16. Attempts should be made here to design the fill level 24 to be as high as possible. The powder fill level 24 should preferably amount to more than 60% here, in FIG. 6 an embodiment is shown, in which the powder fill level 24 lies at approximately 95%.

The described bearing bush 2 or the damping element 32 may be used to damp oscillations which are introduced into the bearing shield 28 or the housing 62 via the rotor axis 4. Here, however, with the layered structure and through the cavities filled with powder with a very small wall thickness, high demands are placed on the manufacturing technique of the bearing bush 2. A suitable manufacturing method, which enables the high demands on the bearing bush 2, is described in more detail.

Figure 7:
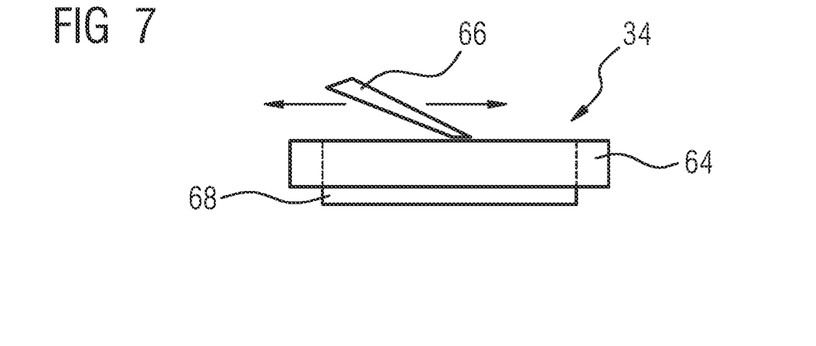
FIG. 7 a schematic representation of a screen printing process incorporating teachings of the present disclosure.

Here FIG. 7 shows a schematic representation of a screen printing method 34, wherein a scraper 66 is moved over a screen 64. Screen printing pastes 40, 44 (representation in FIGS. 11 and 12) are pressed here by the screen 64 onto a substrate 68 or layers already existing.

Figure 8:
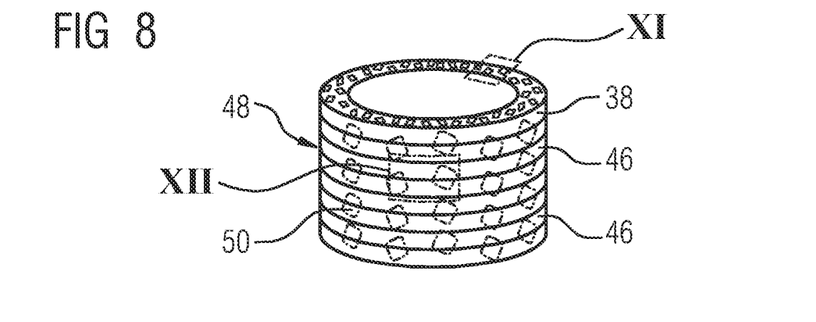
FIG. 8 a layered structure of a green body as a precursor of the damping element according to FIG. 3.

To this end, as shown in FIG. 8, a first layer 38 is firstly generated, on which the further layers 46 are printed until a three-dimensional green body 48 is produced. Here the green body 48 comprises closed volumes 50, which correspond to the cavities 16 of the bearing bush 2 after the manufacturing process has ended. In order to generate these volumes 50, reference is made to FIGS. 11 and 12, wherein FIG. 11 shows a radial cut along the lines XI in FIG. 8 and similarly thereto FIG. 12 reproduces an axial cut along the dashed box XII in FIG. 8.

Figure 11:
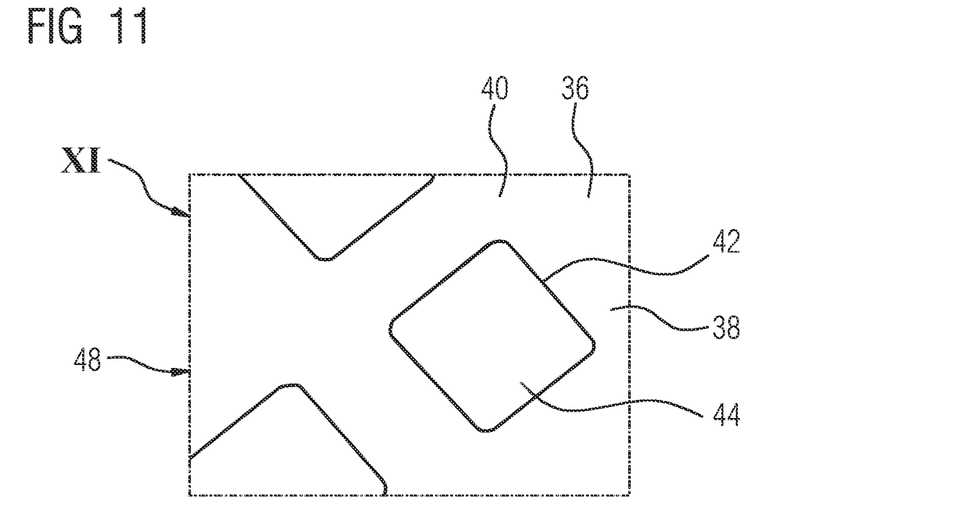
FIG. 11 a cross-section through the cut XI in FIG. 8.

In FIG. 11, the exemplary first layer 38 (which essentially does not differ from the further layers 46) is therefore shown, which has a first subregion 36, which is generated by a first screen printing step with a first screen printing paste 40. In this first screen printing step, a second region 42 is cut out. This region 42 is firstly generated in a second screen printing step with a second screen printing paste 44. For this purpose, two different templates are generally placed on the screen, so that in the second step the second screen printing paste is pressed directly into the cut-out which was cut out in the first step.

Figure 12:
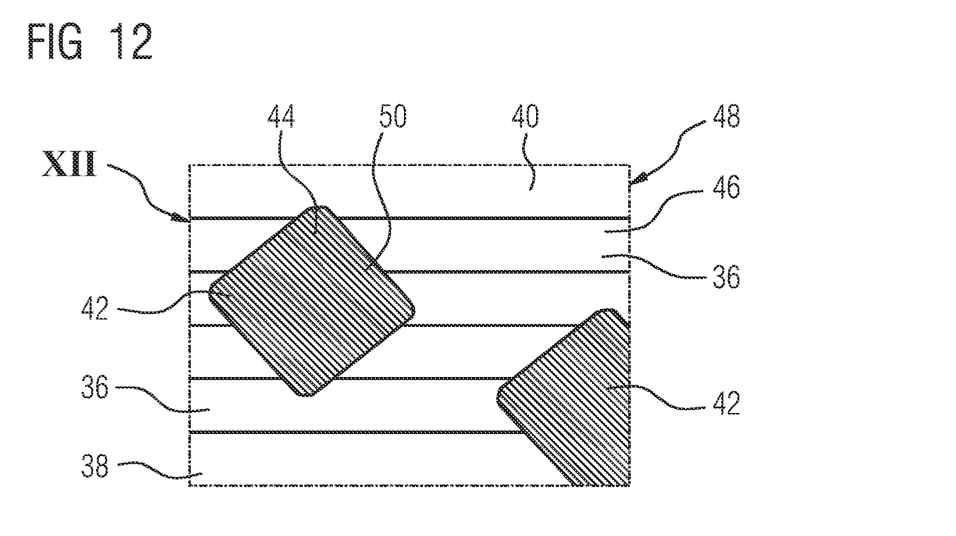
FIG. 12 a cross-section along the cut XII in FIG. 8.

FIG. 12 shows the layered structure and thus a sequence of a plurality of layers, wherein in the described method further layers 46 are pressed onto the first layer 38. It is expedient here for a short drying process, for instance under a UV lamp, to take place after each printing process.

A drying process of this type can last 5 seconds, for instance. If a further drying step is carried out after the first subregion 36 is dried and the second subregion 42 is printed, a layer can therefore be printed in 15-20 seconds. With a conventional layer thickness of 100 μm, it is possible to establish a green body 48 with a height of 1 mm in approx. 200 seconds. This is the layer thickness which is applied during printing. This differs from the layer thickness 14, which was defined in relation to the bearing bush, wherein generally a shrinking at a sintering process of 20% vol is to be calculated. The described manufacturing time represents an above average high production speed for an additive manufacturing method.

Furthermore, the materials for generating the green body 48 or the bearing bush 2 are to be detailed again. It is expedient to use a material based on iron for the first screen printing paste. Corresponding powders of the material to be manufactured, in other words for instance a powder of an iron alloy, are provided with suitable organic or also inorganic binding means, so that a rheologically favorable screen printing paste is produced. The first screen printing paste may include particles made from iron powder (generally an iron alloy), so that the wall structure 26 of the bearing bush 2 is furthermore essentially based on iron.

Figure 9:
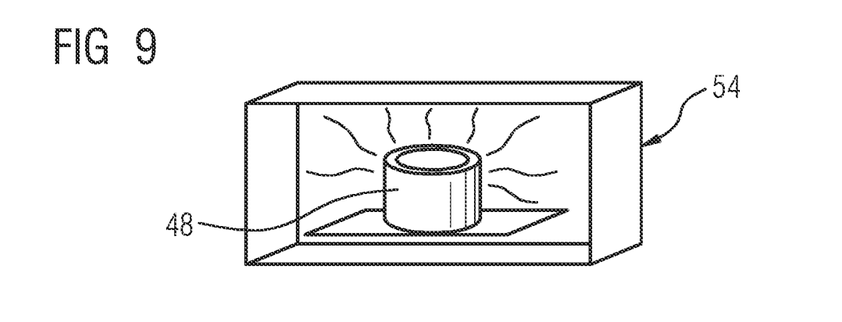
FIG. 9 a debinding process of the green body.

The second screen printing paste 44, which is pressed into the second sub regions 42, comprises here a functional portion of a material, which has a high damping effect on the one side, in other words possibly also a high density, and in the process has a sintering temperature or a melting temperature, which is higher than that of the iron alloy used. The need for this is explained again below with respect to the description of FIG. 9 and FIG. 10. The sintering temperature of a material is lower than the melting temperature, since during sintering no melting of the entire material or the entire particles takes place. Instead, with a sintering process in boundary regions, diffusion processes take place between individual particles, occasionally local melting also results. The melting temperature is therefore higher than the sintering temperature, but the sintering temperature generally correlates with the melting temperature, so that a material with a higher sintering temperature than another material will also have a higher melting temperature. Ceramic materials with a high density and a high sintering temperature are therefore suitable as a material for the second screen printing paste 44, as however are also metals with a high melting temperature and a high density such as e.g. tungsten.

The green body 48 described in FIG. 8 is now subjected to a debinding process 54, in which a reduction in the organic binding means is preferably carried out by excluding oxygen and decomposition processes of the binding means are continuously removed from the atmosphere, by means of gas exchange, for instance. A typical debinding is carried out for instance at temperatures of between 200° C. and 400° C. Furthermore, a thermal treatment process 52, in which the green body 48 is subjected to a sintering process, now takes place. As already described, the sintering temperature lies below the melting point of the material to be sintered, with an iron alloy sintering temperatures between 900 and 1400° C. are expedient. Here the sintering process follows a defined temperature curve, which is attuned precisely to the corresponding metal alloy. The thermal treatment process 52 is preferably carried out here in an inert gas atmosphere.

Figure 10:
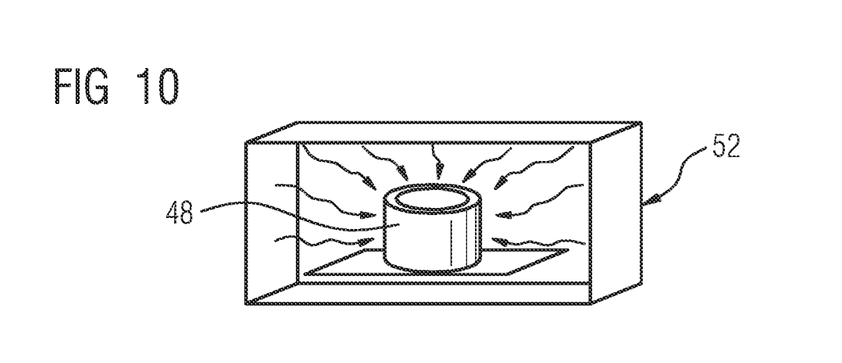
FIG. 10 a thermal treatment process in the form of a sintering process of the green body.

According to the thermal treatment process 52 shown in FIG. 10, the previous green body 48 is no longer referred to as such but is instead rather the bearing bush 2 or a preform of the bearing bush 2 to be processed. A bearing bush 2 of this type is now used in a die casting mold and is cast with aluminum in a die casting process, so that the bearing shield 28 already mentioned surrounds the bearing bush with a material bond.

LIST OF REFERENCE CHARACTERS 2 bearing bush
4 rotating shaft
6 wall of the bearing bush
8 wall thickness
10 bearing bush diameter
12 layers
14 layer thickness
16 cavities
18 powder 20 axial direction
21 radial direction
22 cavity cross-section
24 powder fill level
26 wall structure
28 bearing shield
30 electric motor
32 damping element
34 screen printing method
36 first subregion
38 first layer
40 first screen printing paste
42 second subregion
44 second screen printing paste
46 further layers
48 green body
50 volume
52 thermal treatment process
54 debinding process
58 rotor
60 stator
62 housing
64 screen
66 scraper
68 substrate

The invention claimed is:

1. A bearing bush for a rotating shaft, the bearing bush comprising:
a plurality of layers stacked along a longitudinal axis of the bearing bush, wherein each layer has a thickness along the longitudinal axis between 10 μm and 200 μm;
wherein the individual layers are connected to adjacent layers with a material bond, forming a wall with a wall thickness less than 10% of a diameter of the bearing bush measured transverse to the longitudinal axis; and
the wall includes closed cavities filled with a powder.

2. The bearing bush as claimed in claim 1, wherein the cavities have a maximum cross-section less than 5 mm$^2$.

3. The bearing bush as claimed in claim 1, wherein the cavities have a maximum cross-section less than 3 mm$^2$.

4. The bearing bush as claimed in claim 1, wherein the cavities have a powder fill level of at least 60%.

5. The bearing bush as claimed in claim 1, wherein the cavities have a powder fill level of at least 80%.

6. The bearing bush as claimed in claim 1, wherein the individual layers comprise a metal alloy.

7. The bearing bush as claimed in claim 1, wherein the individual layers comprise an iron alloy.

8. The bearing bush as claimed in claim 1, wherein the powder in the cavities comprises a first material with a higher melting temperature than a second material of the individual layers.

9. The bearing bush as claimed in claim 8, the first material has a higher density than the second material.

10. An electric motor comprising:
a rotor;
a stator; and
a bearing shield with a bearing brush comprising:
a plurality of layers stacked along a longitudinal axis of the bearing brush, wherein each layer has a thickness along the longitudinal axis between 10 μm and 200 μm;
wherein the individual layers are connected to adjacent layers with a material bond, forming a wall with a wall thickness less than 10% of a diameter of the bearing bush measured transverse to the longitudinal axis; and
the wall includes closed cavities filled with a powder.

* * * * *